(12) United States Patent
Flo et al.

(10) Patent No.: US 10,767,644 B2
(45) Date of Patent: Sep. 8, 2020

(54) PISTON FUEL PUMP FOR AN INTERNAL COMBUSTION ENGINE

(71) Applicant: Robert Bosch GmbH, Stuttgart (DE)

(72) Inventors: Siamend Flo, Schwieberdingen (DE); Markus Hilligardt, Korntal-Muenchingen (DE); Heiko Jahn, Tamm (DE); Franz Elischer, Boennigheim (DE); Cornelia Giessler, Beilstein (DE); Bernd Koch, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 465 days.

(21) Appl. No.: 14/651,249

(22) PCT Filed: Oct. 17, 2013

(86) PCT No.: PCT/EP2013/071737
§ 371 (c)(1),
(2) Date: Jun. 11, 2015

(87) PCT Pub. No.: WO2014/095120
PCT Pub. Date: Jun. 26, 2014

(65) Prior Publication Data
US 2015/0308394 A1    Oct. 29, 2015

(30) Foreign Application Priority Data

Dec. 20, 2012    (DE) .................. 10 2012 224 029

(51) Int. Cl.
*F04B 53/14* (2006.01)
*F16J 15/56* (2006.01)
(Continued)

(52) U.S. Cl.
CPC ........... *F04B 53/143* (2013.01); *F02M 59/02* (2013.01); *F02M 59/025* (2013.01);
(Continued)

(58) Field of Classification Search
CPC ...... F04B 39/04; F04B 39/0276; F04B 19/22; F04B 17/05; F04B 39/041; F04B 39/042;
(Continued)

(56) References Cited

U.S. PATENT DOCUMENTS 2,748,718 A * 6/1956 MacClatchie ......... F04B 53/143
92/112
3,770,285 A * 11/1973 Grover ....................... F16J 9/28
277/435
(Continued)

FOREIGN PATENT DOCUMENTS

CN    101688445 A    3/2010
EP    0 156 136 A2    10/1985
(Continued)

OTHER PUBLICATIONS

International Search Report corresponding to PCT Application No. PCT/EP2013/071737, dated Dec. 5, 2013 (German and English language document) (7 pages).

*Primary Examiner* — Essama Omgba
*Assistant Examiner* — Christopher J Brunjes
(74) *Attorney, Agent, or Firm* — Maginot, Moore & Beck LLP

(57) ABSTRACT

A piston fuel pump for an internal combustion engine includes a pump cylinder and a pump piston slidably accommodated in the pump cylinder. The piston fuel pump has a supporting and sealing assembly for the pump piston. The supporting and sealing assembly includes a guiding region configured to axially guide the pump piston in the pump cylinder and a sealing region having a sealing lip.

18 Claims, 2 Drawing Sheets

US 10,767,644 B2
Page 2

(51) Int. Cl.
  *F02M 59/02* (2006.01)
  *F02M 59/44* (2006.01)
  *F04B 15/02* (2006.01)

(52) U.S. Cl.
  CPC ........... *F02M 59/442* (2013.01); *F04B 15/02* (2013.01); *F04B 53/14* (2013.01); *F16J 15/56* (2013.01)

(58) Field of Classification Search
  CPC ...... F04B 39/045; F04B 53/02; F04B 53/008; F04B 53/14; F04B 53/16; F04B 53/143; F04B 15/02; F04B 47/00; F04B 1/00; F04B 53/08; F02M 59/06; F02M 59/025; F02M 59/027; F02M 59/02; F02M 59/442; F16J 3/06; F16J 15/16; F16J 9/12; F16J 9/20; F02B 55/04
  See application file for complete search history.

(56) References Cited

U.S. PATENT DOCUMENTS

| | | | |
|---|---|---|---|
| 4,245,654 A | 1/1981 | Raitto | |
| 4,555,980 A * | 12/1985 | Hoglund | F15B 15/082 277/345 |
| 4,601,235 A * | 7/1986 | Roberts | F04B 53/143 277/437 |
| 4,602,791 A * | 7/1986 | Zollner | F16J 15/166 277/437 |
| 5,975,212 A * | 11/1999 | Johnston | E21B 34/10 137/629 |
| 5,992,768 A | 11/1999 | Beatty et al. | |
| 6,327,964 B1 * | 12/2001 | Schuller | B60T 8/4031 92/248 |
| 6,957,605 B1 * | 10/2005 | Blume | F04B 53/143 277/436 |
| 2003/0136260 A1 * | 7/2003 | Sano | F02M 59/102 92/168 |
| 2007/0044746 A1 * | 3/2007 | Sailer | F01L 1/022 123/90.55 |
| 2007/0274847 A1 * | 11/2007 | Cromm | F04B 37/14 417/397 |
| 2008/0224417 A1 * | 9/2008 | Benson | F02M 59/02 277/411 |
| 2010/0074780 A1 * | 3/2010 | Riley | F04B 53/143 417/437 |

FOREIGN PATENT DOCUMENTS

| | | |
|---|---|---|
| EP | 1 284 367 A1 | 2/2003 |
| GB | 1 274 999 | 5/1972 |
| GB | 2 332 035 A | 6/1999 |
| JP | 60-227062 A | 11/1985 |
| JP | 2-54970 U | 4/1990 |
| JP | 2005-133681 A | 5/2005 |
| JP | 2005-337061 A | 12/2005 |
| JP | 2012-31850 A | 2/2012 |

* cited by examiner

PISTON FUEL PUMP FOR AN INTERNAL COMBUSTION ENGINE

This application is a 35 U.S.C. § 371 National Stage Application of PCT/EP2013/071737, filed on Oct. 17, 2013, which claims the benefit of priority to Serial No. DE 10 2012 224 029.2, filed on Dec. 20, 2012 in Germany, the disclosures of which are incorporated herein by reference in their entirety.

BACKGROUND

The disclosure relates to a piston-type fuel pump according to the following description.

Fuel systems of internal combustion engines in which the fuel, from a fuel tank, is delivered at high pressure into a fuel rail by means of a mechanically driven piston-type fuel pump are known on the market. For this purpose, there is provided in the piston-type fuel pump a displaceably mounted pump piston which compresses fuel in a delivery chamber of the piston-type fuel pump. The pump piston is guided in a piston bushing in sliding fashion by way of a close fit and with a small sealing gap. The piston bushing must have a certain length for support and for sealing by way of a gap seal, and must possibly accommodate large lateral forces. Therefore, the piston bushing is often produced from steel. Owing to high tolerance demands, use is furthermore made of a so-called "piston pairing", that is to say every pump housing is assigned a particular piston. Furthermore, the cylinder in the pump housing must be honed, which is cumbersome.

SUMMARY

The problem on which the present disclosure is based is solved by means of a piston-type fuel pump having the features described below. Advantageous refinements of the disclosure are specified in the following description. Further features of importance for the disclosure can furthermore be found in the following description and in the drawing.

The piston-type fuel pump according to the disclosure has the advantage that a piston bushing, and the corresponding highly accurate fit of the piston in the piston bushing, are no longer imperatively necessary, and thus considerable costs can be saved. Instead, the functions of mounting and sealing are separated into a mounting region and a sealing region. The sealing lip thereof permits low-friction, gap-free and thus highly accurate sealing. By virtue of the fact that the sealing lip is of elastic form and bears under preload against a pump cylinder wall at least in sections, a preload is generated. Owing to the preload, a sealing function in the sealing region can be ensured even during a suction stroke of the piston-type fuel pump, that is to say when the pump piston moves to bottom dead center. During the compression stroke, that is to say when the pump piston moves to top dead center, it is then possible for the sealing lip—if it is directed toward the delivery chamber—to be pressed sealingly against the pump cylinder wall with pressure assistance by the fuel pressure prevailing in the delivery chamber.

One refinement of the piston-type fuel pump provides that the piston-type fuel pump comprises a plastics element on which the mounting and sealing arrangement is formed. Through the provision of the plastics element, the high tolerance demands are eliminated, and it is possible to dispense with an additional honing process on the assembly line of the piston-type fuel pump. Furthermore, it is possible for the plastics element to be produced as a simple injection-molded part, whereby it can be produced particularly inexpensively. Also, the risk of "piston seizing" owing to material melting can be avoided through the selection of the plastics element.

It is also proposed that the plastics element be produced from polyamide (PA) and/or from polyether ether ketone (PEEK). It has been found that, if the plastics element is produced from polyamide (PA) or polyether ether ketone (PEEK), very good results can be attained with regard to the guidance or mounting in the guide region and with regard to the sealing in the sealing region.

One refinement of the piston-type fuel pump provides that the mounting and sealing arrangement is fixedly connected to the pump piston, the pump piston preferably having a circular ring-shaped shoulder to which the mounting and sealing arrangement is clipped and/or adhesively bonded. Owing to the connection of the plastics element to the pump piston, the plastics element can follow the upward and downward movement of the pump piston, wherein, in the case of a clip connection, the connection can preferably be detached and remade. Consequently, the plastics element can be replaced if it becomes worn.

In this case, the shoulder may be arranged in the vicinity of an end section, which faces toward a delivery chamber of the pump, of the pump piston. The provision of the shoulder in the vicinity of the end section is advantageous, as the guide section can thus be arranged close to a possible mounting or force action point, and lateral forces exerted on the end section of the pump piston can be accommodated by the plastics element.

It is furthermore proposed that the mounting and sealing arrangement is of unipartite form. By virtue of the plastics element being produced in one piece, it is possible for said plastics element to be produced in only one manufacturing step, for example by way of an injection molding process.

A further refinement of the piston-type fuel pump provides that the mounting and sealing arrangement is of multi-part form. This is advantageous as it is possible to select different plastics for the guide region and for the sealing region in accordance with the respective requirements, that is to say for the guidance and/or mounting and for the sealing function.

A further refinement of the piston-type fuel pump according to the disclosure is characterized in that the parts of the mounting and sealing arrangement are clipped and/or adhesively bonded to one another. This is advantageous, because it is possible for the parts to be connected to one another regardless of the selected material, that is to say regardless of the material of the guide region and of the sealing region.

It may also conceivably be provided that, between the plastics element and pump cylinder in the region of the guide region, there is a gap in the range of approximately 1/100 mm to approximately 10/100 mm, preferably of approximately 3/100 mm. This is advantageous as jamming of the pump piston in the pump cylinder can be avoided by way of the gap.

A further refinement of the piston-type fuel pump provides that a second mounting arrangement, in particular a second plastics element, for the mounting of the pump piston is arranged preferably positionally fixedly relative to the pump cylinder in the vicinity of an end section, which faces away from a delivery chamber of the pump, of the pump piston. The pump piston is consequently guided and/or mounted at two mounting points. Firstly, guidance and/or mounting is imparted by the guide section of the plastics element, and secondly, guidance and/or mounting is imparted by the second plastics element. The respective guidance and/or mounting points are in this case situated in the respective end sections of the pump piston, close to the force action points at which lateral forces can arise, for example in the vicinity of the cam drive of the pump piston. Thus, the loads on the guidance and/or mounting points can be reduced.

BRIEF DESCRIPTION OF THE DRAWINGS

Examples of the present disclosure will be discussed in more detail below with reference to the appended drawings, in which.

DETAILED DESCRIPTION

Figure 1:
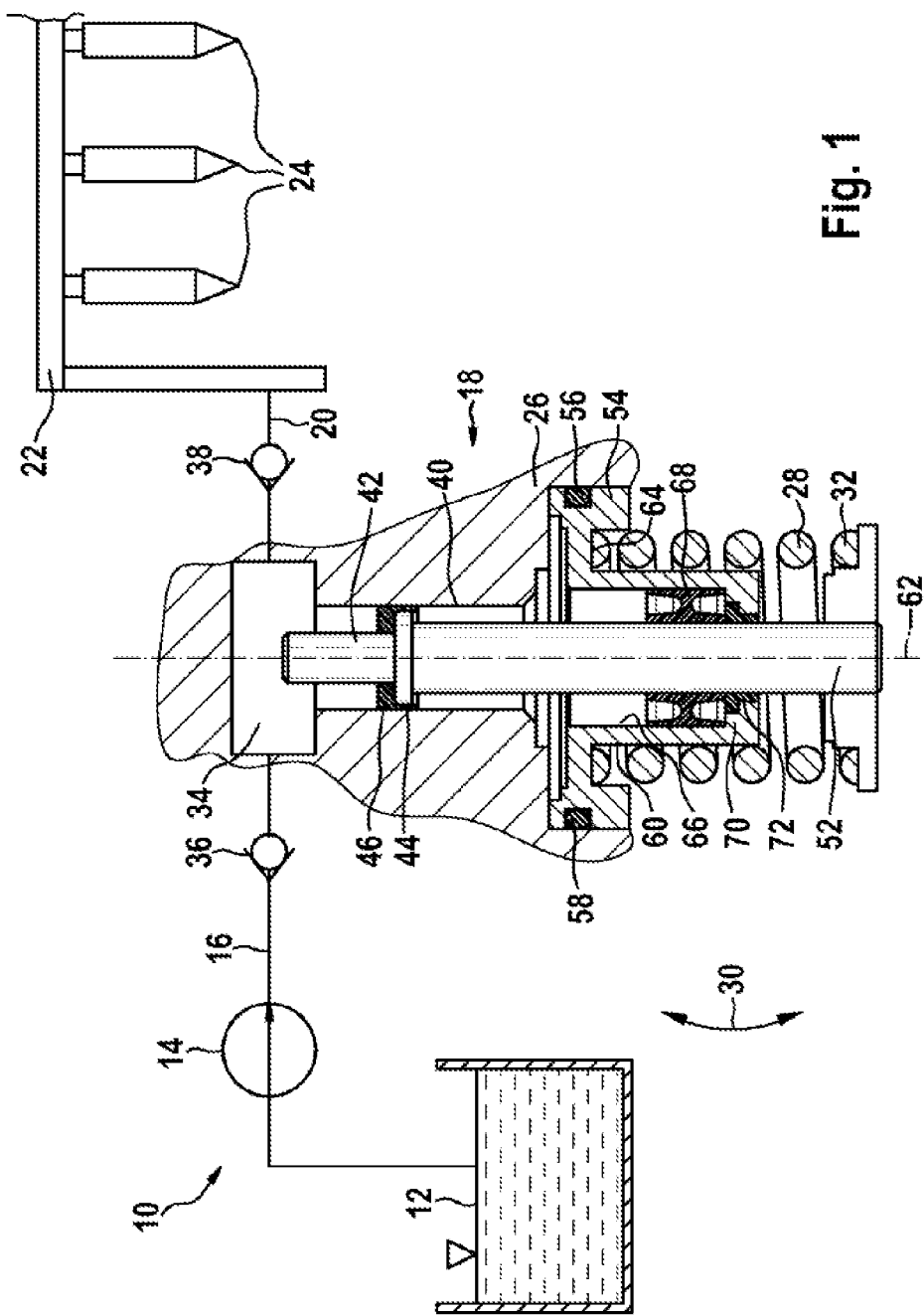
FIG. 1 is a schematic illustration of a fuel system of an internal combustion engine, with a detail of a piston-type fuel pump according to the disclosure, which in turn has a mounting and sealing arrangement.

A fuel system of an internal combustion engine is denoted overall by the reference sign 10 in FIG. 1. Said fuel system comprises a fuel tank 12 from which the fuel is delivered by an electric predelivery pump 14 into a low-pressure line 16. Said low-pressure line leads to a high-pressure pump in the form of a piston-type fuel pump 18. From the latter, a high-pressure line 20 leads to a fuel rail 22. To the latter there are connected multiple injectors 24 which inject the fuel directly into respectively associated combustion chambers (not illustrated).

The piston-type fuel pump 18 comprises a pump housing 26, only regions of which are indicated and in which a pump piston 28 is guided and/or mounted in displaceable fashion. Said pump piston can be set in reciprocating motion by a cam drive (not illustrated), as indicated by a double arrow 30 plotted to the side. The pump piston is forced into a dead center, which is a bottom dead center in FIG. 1, by a helical spring 32. The pump piston 28 and the pump housing 26 delimit a delivery chamber 34. Said delivery chamber 34 can be connected by way of an inlet valve 36 to the low-pressure line 16. Furthermore, the delivery chamber 34 can be connected by way of an outlet valve 38 to the high-pressure line 20.

Both the inlet valve 36 and the outlet valve 38 are in the form of check valves. Here, an embodiment of the inlet valve 36 as a flow control valve is not illustrated but is possible. In the case of such an embodiment, the inlet valve 36 can be forcibly opened during a delivery stroke of the pump piston 28, such that the fuel is delivered not into the fuel rail 22 but back into the low-pressure line 16. In this way, the fuel quantity delivered into the fuel rail 22 by the piston-type fuel pump 18 can be adjusted.

The pump piston 28 is guided in a pump cylinder 40, which is thus part of the pump housing 26. The pump piston 28 has, at an end facing toward the delivery chamber 34, an end section which is an upper end section 42 in FIG. 1. In the vicinity of said upper end section 42, the pump piston 28 furthermore has a circular ring-shaped shoulder in the manner of a radially projecting encircling collar 44. The pump piston 28 or the shoulder 44 is clipped to a mounting and sealing arrangement which is formed by a plastics element 46, wherein the plastics element 46 has a guide region 48 for the axial guidance and/or radial mounting of the pump piston 28 in the pump cylinder 40, and has a sealing region 50 in the form of a sealing lip. The shoulder 44 and the plastics element with guide region 48 and sealing region 50 can be more clearly seen in FIGS. 2 and 3.

At its end facing away from the delivery chamber 34, the pump piston 28 furthermore has an end section which is a lower end section 52 in FIG. 1. In the vicinity of said lower end section 52, a guide sleeve 54 is arranged fixedly on the pump housing 26. Between the guide sleeve 54 and the pump housing 26, an O-ring seal 56 is provided in a groove 58. The guide sleeve 54 has a cylindrical section 60 which extends coaxially with respect to the pump piston 28 and which guides the helical spring 32. Along a piston longitudinal axis 62, the helical spring 32 protrudes at least in sections into a spring receiving groove 64 of the guide sleeve 54, where said helical spring is supported axially against the guide sleeve 54.

The guide sleeve 54 furthermore has, in the interior, a circular cylindrical receiving section 66 which is formed substantially by the internal circumferential wall of the cylinder section 60. In said receiving section 66, an annular sealing element 68 is arranged positionally fixedly relative to the pump housing 26, wherein the sealing element 68 has an H-shaped cross section. In a collar section 70 which extends radially inward on the projecting end of the cylindrical section, a second plastics element 72 is furthermore likewise arranged positionally fixedly relative to the pump housing 26. Said second plastics element 72, which is thus spaced apart considerably from the first plastics element 46 as viewed in the axial direction of the pump piston 28, serve, together with the guide region 48 of the plastics element 46, to realize the guidance and two-point mounting of the pump piston 28.

The mounting point of the second plastics element 72 is situated in the vicinity of the point at which force is introduced by the helical spring 32 and/or by the cam drive (not illustrated), at the lower end section 52 of the pump piston 28 in FIG. 1. A torque loading of the bearing points can thus be reduced. By virtue of the mounting being separated into the guide region 48 of the plastics element 46 and the plastics element 72, the mounting can be provided in the vicinity of the upper end section 42 and in the vicinity of the lower end section 52 of the pump piston 28, whereby the influence of lateral forces can be reduced. A resulting lower bearing load thus permits the use of the plastics element 46, 72.

Figure 2:
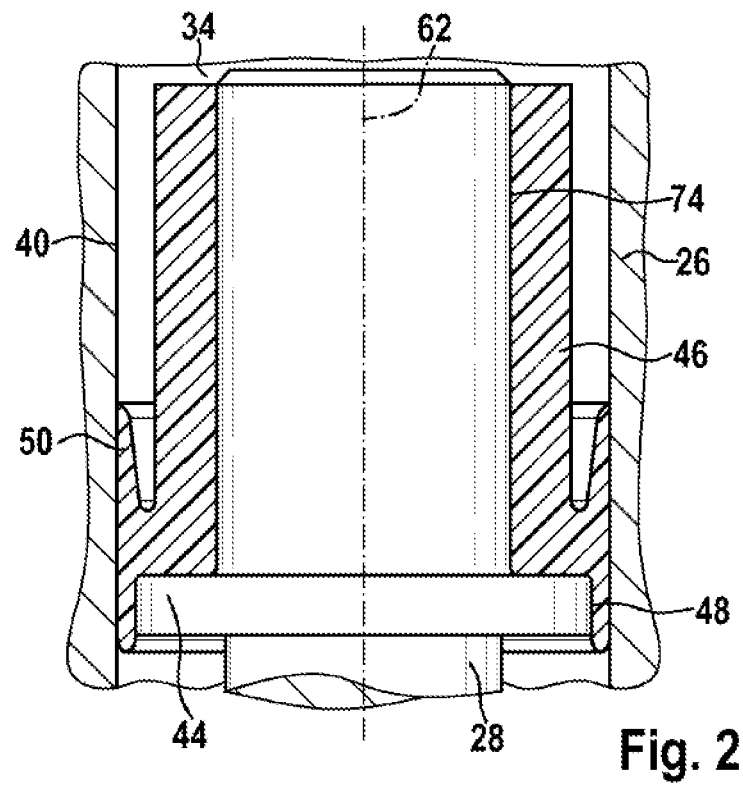
FIG. 2 is an enlarged sectional illustration of the detail of the piston-type fuel pump as per FIG. 1, for discussion of the mounting and sealing arrangement.

The embodiment of the plastics element 46 is of particular significance in the present case. This will therefore be discussed in more detail with reference to FIGS. 2 and 3:

FIG. 2 shows, in a sectional illustration, a detail of the piston-type fuel pump 18, wherein the plastics element 46 can be clearly seen. In an upper region in FIG. 2, the plastics element 46 has an insertion section 74 in the form of a straight tubular section which is coaxial with respect to the pump piston 28 and through which the pump piston 28 extends and/or which is pushed onto said pump piston. In a lower region in FIG. 2, the plastics element 46 is clipped by way of the shoulder 44 to the pump piston 28. In particular, that material region of the plastics element 46 which is provided radially outside the outer shell surface of the shoulder 44 forms the mounting and/or guiding region 48 already mentioned above, by way of which the pump piston 28 is guided and radially mounted in sliding fashion in the pump cylinder 40.

The guide region 48 is at a distance (not visible in the figures) of approximately 3/100 mm from an internal circumferential wall 76 of the pump cylinder 40. In an axial direction, that is to say along the piston longitudinal axis 62, the sealing region 50, in the form of a sealing lip, extends toward the delivery chamber 34 so as to adjoin the guide region 48. The sealing lip 50, in this case in the form of a tubular section which is formed integrally on the guide region 48 and which is elastically preloaded in a radially outward direction, extends substantially coaxially with respect to the pump piston 28. The guide region 48 and the sealing region 50 are of unipartite form in FIGS. 2 and 3.

Figure 3:
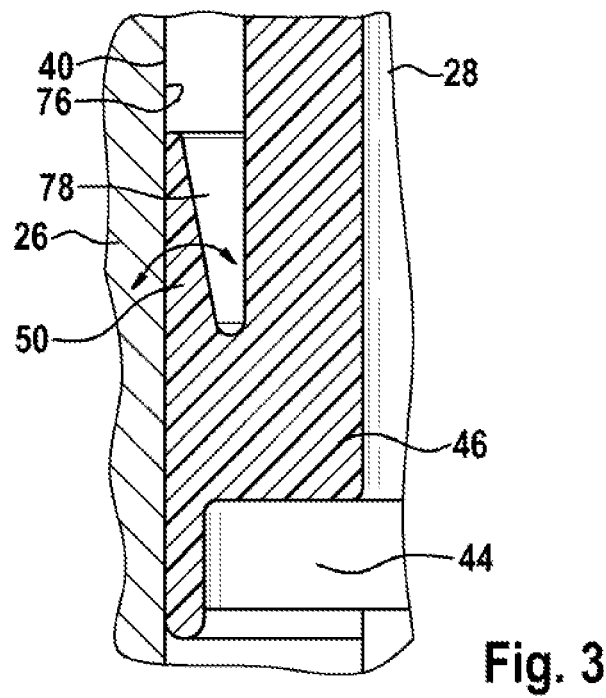
FIG. 3 shows an enlarged detail from the sectional illustration as per FIG. 2.

As can be seen once again on an enlarged scale in FIG. 3, the sealing lip 50 bears under preload against the internal circumferential wall 76 of the pump cylinder 40. Between the sealing lip and the sealing region 50 there is provided, in the plastics element 46, a recess which forms a pressure assistance region 78. Said pressure assistance region 78 is designed such that, during a movement of the pump piston 28 toward top dead center, that is to say during the delivery stroke of the piston-type fuel pump 18, the pressure prevailing in the delivery chamber 34 acts in the pressure assistance region 78 and thus also on the free outer side of the sealing lip, whereby the sealing lip 50 is, in addition to the preload, loaded with sealing action in the direction of the wall 76.

The invention claimed is:

1. A piston-type fuel pump for an internal combustion engine, the piston-type fuel pump comprising:
   a pump cylinder;
   a pump piston displaceably received in the pump cylinder, the pump piston including a shoulder having a circular ring-shape; and
   a mounting and sealing arrangement including:
      a guide region spaced apart from the pump cylinder by less than 0.1 mm and in direct contact with the shoulder of the pump piston, the guide region configured to axially guide the pump piston in the pump cylinder; and
      a sealing region axially spaced apart from the guide region, the sealing region including:
         a sealing lip in direct contact with the pump cylinder,
         a cylindrical section that is cylindrical in shape and is in direct contact with the pump piston, and
         a recess defined radially between the cylindrical section and the sealing lip,
   wherein the mounting and sealing arrangement is formed as a contiguous structure,
   wherein the guide region is radially interposed between the shoulder and the pump cylinder, and the sealing region is not radially interposed between the shoulder and the pump cylinder,
   wherein the cylindrical section and the sealing lip extend away from the shoulder in a first axial direction, and
   wherein the cylindrical section extends away from the shoulder by a greater axial distance than the sealing lip.

2. The piston-type fuel pump as claimed in claim 1, wherein the mounting and sealing arrangement is formed by a plastics element.

3. The piston-type fuel pump as claimed in claim 2, wherein the plastics element is made from at least one of polyamide and polyether ether ketone.

4. The piston-type fuel pump as claimed in claim 1, wherein:
   the mounting and sealing arrangement is fixedly connected to the shoulder.

5. The piston-type fuel pump as claimed in claim 1, wherein:
   the shoulder is arranged in an end section of the pump piston, and
   the end section faces toward a delivery chamber of the piston-type fuel pump.

6. The piston-type fuel pump as claimed in claim 1, wherein the mounting and sealing arrangement is a single, undivided part.

7. The piston-type fuel pump as claimed in claim 1, wherein the mounting and sealing arrangement is formed of multiple parts.

8. The piston-type fuel pump as claimed in claim 7, wherein the parts of the mounting and sealing arrangement are clipped and/or adhesively bonded to one another.

9. The piston-type fuel pump as claimed in claim 1, wherein:
   a gap is defined between the pump cylinder and guide region, and
   the gap has a span of between 1/100 mm and 10/100 mm.

10. The piston-type fuel pump as claimed in claim 9, wherein the gap has a span of 3/100 mm.

11. The piston-type fuel pump as claimed in claim 1, further comprising:
   a second mounting arrangement configured to guide the pump piston, the second mounting arrangement arranged positionally fixedly relative to the pump cylinder in a vicinity of an end section of the pump piston, the end section facing away from a delivery chamber of the piston-type fuel pump.

12. The piston-type fuel pump as claimed in claim 11, wherein the second mounting arrangement is a plastics element.

13. The piston-type fuel pump as claimed in claim 1, wherein the sealing lip is formed concentrically about the cylindrical section.

14. The piston-type fuel pump as claimed in claim 1, wherein the recess is open to a delivery chamber of the piston-type fuel pump.

15. The piston-type fuel pump as claimed in claim 1, wherein:
   the shoulder is shaped as a radially projecting encircling collar having a first end and a second end,
   the pump piston extends in a first direction from the first end and in a second direction from the second end, and
   the pump piston has a smaller diameter than the shoulder immediately adjacent to the shoulder in the first direction and has a smaller diameter than the shoulder immediately adjacent to the shoulder in the second direction.

16. The piston-type fuel pump as claimed in claim 1, wherein the shoulder protrudes radially outwardly from axially adjacent sections of the pump piston.

17. The piston-type fuel pump as claimed in claim 1, wherein the mounting and sealing arrangement partially defines a delivery chamber of the fuel pump, and the shoulder is sealed from the delivery chamber by the sealing region.

18. A piston-type fuel pump for an internal combustion engine, the piston-type fuel pump comprising:
   a pump cylinder formed within a pump housing;
   a pump piston configured to be displaceably received in the pump cylinder;
   a guide sleeve fixedly coupled to the pump housing, the guide sleeve having a cylindrical section arranged coaxially about the pump piston, the cylindrical section including an internal wall facing toward the pump piston, and the internal wall arranged nearest to the pump piston at an inwardly projecting portion of the guide sleeve;
   a mounting and sealing arrangement, including:

a guide region configured to axially guide the pump piston in the pump cylinder, and a sealing region axially spaced apart from the guide region, the sealing region having a sealing lip in direct contact with the pump cylinder, a cylindrical portion that is cylindrical in shape and in direct contact with the pump piston, and a recess defined radially between the cylindrical portion and the sealing lip; and a second mounting arrangement configured to guide the pump piston, the second mounting arrangement arranged positionally fixedly relative to the pump cylinder, and the second mounting arrangement arranged in the inwardly projecting portion, wherein the mounting and sealing arrangement is formed as a contiguous structure, wherein the guide region is radially interposed between the shoulder and the pump cylinder, and the sealing region is not radially interposed between the shoulder and the pump cylinder, wherein the cylindrical portion and the sealing lip extend away from the shoulder in a first axial direction, and wherein the cylindrical portion extends away from the shoulder by a greater axial distance than the sealing lip.

\* \* \* \* \*